US008508755B2

(12) United States Patent
Ding

(10) Patent No.: US 8,508,755 B2
(45) Date of Patent: Aug. 13, 2013

(54) PRINT SERVER

(75) Inventor: Yi Ding, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 1213 days.

(21) Appl. No.: 11/830,129

(22) Filed: Jul. 30, 2007

(65) Prior Publication Data

US 2009/0033976 A1  Feb. 5, 2009

(51) Int. Cl.
*G06F 3/12* (2006.01)
(52) U.S. Cl.
USPC .......................................... 358/1.13; 709/226
(58) Field of Classification Search
USPC ....................................... 709/226; 358/1.13
See application file for complete search history.

(56) References Cited

U.S. PATENT DOCUMENTS

| 5,580,177 | A | * | 12/1996 | Gase et al. | 400/61 |
| 6,003,069 | A | * | 12/1999 | Cavill | 709/205 |
| 6,369,909 | B1 | | 4/2002 | Shima | |
| 6,920,506 | B2 | * | 7/2005 | Barnard et al. | 709/245 |
| 2002/0103853 | A1 | * | 8/2002 | Copp et al. | 709/203 |
| 2003/0231328 | A1 | * | 12/2003 | Chapin et al. | 358/1.13 |
| 2004/0070779 | A1 | * | 4/2004 | Ferlitsch | 358/1.13 |
| 2005/0117948 | A1 | * | 6/2005 | Hatta et al. | 400/62 |
| 2005/0138065 | A1 | | 6/2005 | Ciriza | |
| 2008/0091700 | A1 | | 4/2008 | Brotherson | |

FOREIGN PATENT DOCUMENTS

| JP | 2006-092373 | 4/2006 |
| JP | 2007-172469 | 7/2007 |
| WO | WO 00/68817 | 11/2000 |

OTHER PUBLICATIONS

Simple Service Discovery Protocol. Wikipedia, the free encyclopedia. [retrieved on Sep. 11, 2008]. pp. 1. Retrieved from the Internet: <URL: http://en.wikipedia.org/wiki/Simple_Service_Discovery_Protocol>.
Beatty, J., et. al, Web Services Dynamic Discovery. Published by Microsoft Corporation [online], Apr. 2005 [retrieved on Sep. 11, 2008]. pp. 1-42. Retrieved from the Internet: <URL: http://specs.xmlsoap.org/ws/2005/04/discovery/ws-discovery.pdf>.
Goland, Y., et. al, Simple Service Discovery Protocol/1.0, Operating without an Arbiter (SSDP). Published by Internet Engineering Task Force [online], Oct. 1999 [retrieved on Sep. 11, 2008]. pp. 1-18. Retrieved from the Internet: <URL: http://ietfreport.isoc.org/all-ids/draft-cai-ssdp-v1-03.txt>. Redmond, Washington, USA.
European Search Report received in EPP99309 dated Nov. 29, 2010 (9 pages).
European Office Action received in Application No. 08 252 541.1-1245 dated May 16, 2012 (9 pages).

* cited by examiner

*Primary Examiner* — David Lazaro
*Assistant Examiner* — Marie Georges Henry
(74) *Attorney, Agent, or Firm* — Hickman Palermo Truong Becker Bingham Wong LLP

(57) ABSTRACT

Techniques are provided for servicing client requests to print data. A client sends print requests to a print server. The print server acts as an intermediary between clients and multiple printing devices. The print server includes drivers for the printing devices that are connected to the same network. The print server retrieves and store capabilities of each printing device. A print request from a client includes multiple parameters. If the capabilities of one or more printing devices satisfy the multiple parameters, then the one or more printing devices are identified as candidates to service the print request. The print server determines which of the candidates is the best match. The print server sends the print request to the determined best match.

18 Claims, 4 Drawing Sheets

PRINT SERVER

TECHNICAL FIELD

The present disclosure relates to printing electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A business enterprise may have many printing devices with different capabilities located on the same floor or in the same general area. Some users might desire to use a printing device that meets certain requirements. Examples of requirements of a printing device include guaranteeing a certain level of security, supporting color printing, providing a certain print speed or page throughput, location on a certain floor of a building, etc. To print a document to the printing device that meets all the requirements, the user must know which printer(s) meet the requirements. This knowledge may be lacking for users who are unfamiliar with available printing devices or even for familiar users in a large enterprise environment. In some cases the user is required to have a printer driver for the desired printer installed on the user's computer.

SUMMARY

In various embodiments, a method, machine-readable medium, and an apparatus are provided for automatically servicing client requests to print data. In an embodiment, a print server receives a request from a client to print one or more documents that are reflected in print data included in the request. The print server may receive multiple parameters from the client. The parameters may specify different capabilities that a printing device should and/or must have in order to print the one or more documents. The print server determines, based on the parameters, a particular printing device from a plurality of printing devices. Based on the determination, the print server sends the print data to the particular printing device. As a result, a user is not required to know detailed information about a particular printing device that meets the user's requirement. In an embodiment, the user is not required to have a printer driver for the particular printing device installed on the user's computer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
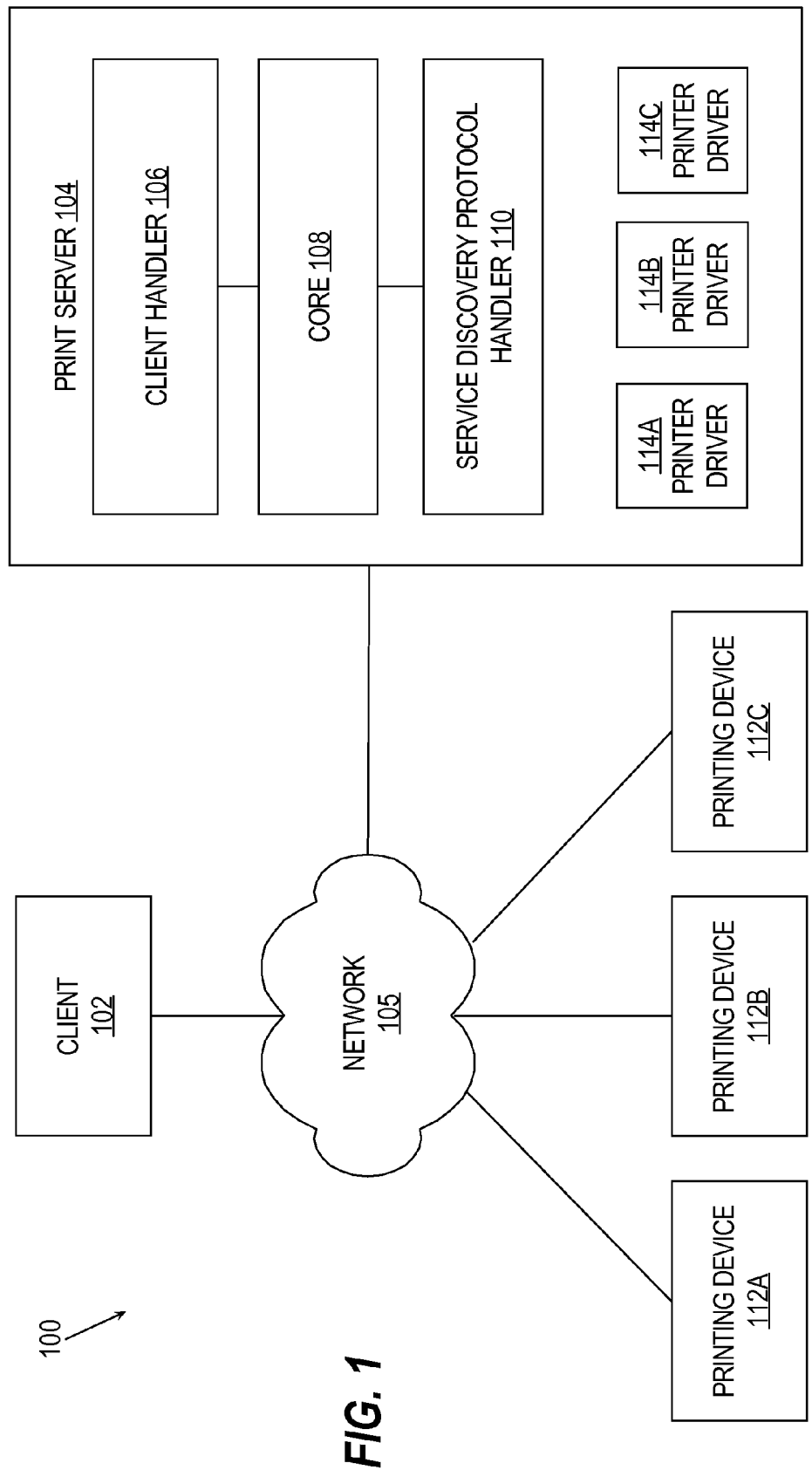
FIG. 1 illustrates an example network architecture and components of a print server.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a data processing apparatus comprises a network interface capable of coupling to a network; one or more printer drivers each capable of directing data to one or more compatible printing devices that may be in the network; print server logic which when executed by one or more processors is operable to perform the machine-implemented steps of: receiving, from a client computer that lacks one or more of the printer drivers, a request to print one or more documents represented in print data in the request; receiving, from the client, one or more parameters for printing the one or more documents; determining, based on the multiple parameters, a particular printing device from among the one or more printing devices; and based on the determination, converting the print data using one or the printer drivers that is compatible with the particular printing device and sending the converted print data to the particular printing device.

In an embodiment the print server logic comprises a client handler and a service discovery protocol handler, and the service discovery protocol handler is operable when executed to perform discovering the one or more printing devices in the network using requests in a service discovery protocol. In an embodiment the client handler is operable when executed to perform sending confirmation data to the client that informs the client that the print data was successfully printed at the particular printing device, and the confirmation data includes a name and location of the particular printing device.

In an embodiment, the print server logic further comprises logic which when executed is operable to determine the particular printing device that best satisfies the parameters.

In an embodiment, the print server logic further comprises logic which when executed is operable to perform: receiving, in the request from the client, weight values associated with each of the parameters, and each of the weight values indicates an importance of the associated parameter; and determining the particular printing device that best satisfies the parameters when the parameters are weighted according to the weight values.

In an embodiment, the print server logic further comprises logic which when executed is operable to perform receiving an advertisement message from one of the printing devices that indicates that the printing device is available to service requests. In an embodiment the print server logic further comprises logic which when executed is operable to perform installing one of the drivers for the particular printing device.

In an embodiment, the print server logic further comprises logic which when executed is operable to perform retrieving, from one of the drivers, print capability data identifying one or more capabilities of the particular printing device. In an embodiment, the print server logic further comprises logic which when executed is operable to perform retrieving print capability data from the particular printing device indicating the print capabilities of the particular printing device.

In an embodiment, the parameters comprise at least one of a location of one of the printing devices relative to the client or one or more security features of one of the printing devices.

In an embodiment, the print server logic further comprises logic which when executed is operable to perform creating and storing an availability queue comprising information identifying the printing devices that are available and that satisfy the parameters, and removing information identifying the particular printing device in response to receiving an error message from the particular printing device indicating that a print job failed to print at the particular printing device. In an embodiment, the availability queue may be sorted so that entries in the queue represent printing devices ordered by how well the available printing devices satisfy the parameters or client request.

In an embodiment, the print server logic further comprises logic which when executed is operable to perform selecting a second printing device from the availability queue in response to receiving the error message, converting the print data using one or the printer drivers that is compatible with the second printing device, and sending the converted print data to the second printing device.

Example Network Architecture

FIG. 1 is a block diagram that illustrates an example network architecture and components of a print server. In example network architecture 100, client 102 is communicatively coupled to print server 104 via a network 105. Printing devices 112A, 112B, 112C are also communicatively coupled to print server 104 via network 105.

Network 105 may be implemented by any medium or mechanism that provides for the exchange of data between client 102 and print server 104 and between the print server and printing devices 112A-C. Examples of network 105 include, without limitation, a network such as a Local Area Network (LAN), Wide Area Network (WAN), Ethernet or the Internet, or one or more terrestrial, satellite, or wireless links.

Client 102 may be any computer, electronic device, system, software or process that is capable of sending print data to print server 104. Although only one client 102 is illustrated, print server 104 may service many clients (not shown).

Printing devices 112A-C are devices that receive print data and print one or more documents reflected in the print data. Although only three printing devices 112A-C are shown, there may be any number of printing devices 112A-C connected to network 105. Each of printing devices 112A-C may be a multi-functional peripheral (MFP) that provides services other than a print service. For example, printing device 112A may provide a scanning service, a fax service, and an archiving service. Printing devices 112A-C may comprise laser printers, ink jet printers, or any other form of data printing device. In an embodiment, one or more of the printing devices 112A-C hosts an HTTP server and a Web Services logic module; in this embodiment, the printing devices can receive HTTP GET requests from print server 104 and can respond with HTTP POST responses. Alternatively, Web Services messages can be exchanged using XML and/or SOAP.

Print Server

In an embodiment, print server 104 comprises a client handler 106, a core 108, and a service discovery protocol (SDP) handler 110. Print server 104 may comprise additional components or fewer components. In the latter case, the functionality of client handler 106, core 108, and SDP handler 110 may be combined into one or two components.

Client Handler

In an embodiment, client handler 106 is generally responsible for communicating with client 102. Client handler 106 "listens" on one or more ports for incoming client print requests. Client handler 106 also sends data to client 102. The data may include data that the client handler 106 received from core 108. In an embodiment, the data sent to client 102 may be capability data that indicates the print capabilities of each printing device to which print server 104 is connected. The data to client 102 may be confirmation data that informs client 102 that print data, included in a print request from client 102, was successfully printed at a particular printing device. Client handler 106 may comprise one or more modules.

Service Discovery Protocol Handler

In an embodiment, Service Discovery Protocol (SDP) handler 110 discovers printing devices 112A-C in the network using one or more network-based service discovery protocols. Example service discovery protocols include WS-Discovery and Simple Service Discovery Protocol (SSDP). WS-Discovery is described in J. Beatty et al., "Web Services Dynamic Discovery (WS-Discovery), April 2005. SSDP is described in Y. Goland et al., "Simple Service Discovery Protocol/1.0 Operating without an Arbiter (SSDP), IETF Internet-Draft, Oct. 28, 1999. SDP handler 110 may support any number and type of discovery protocols. SDP handler 110 may comprise one or more modules.

In an embodiment, SDP handler 110 receives and installs any required print drivers 114A-114C that are needed to communicate print data from the print server 104 to printing devices 112A-C respectively. Each of the print drivers 114A-C comprises a mechanism for converting print data to a form specific to a printing device. In various embodiments, print drivers may be implemented in software, firmware, hardware or a combination. In an embodiment, the print drivers allow applications to initiate printing without being aware of the technical details of each printing device model. In an embodiment, print server 104 receives and installs a driver 114A-C corresponding to each printing device 112A-C. In an embodiment, client 102 does not install drivers for printing devices 112A-C and drivers are installed only on the print server 104. Print drivers may be retrieved automatically from a node on the network or may be installed by a user, such as a system administrator.

A benefit of this approach is that client 102 does not need to receive an additional driver whenever a new printer is introduced into the network. Thus, in FIG. 1, client 102 is shown without a printer driver for printing devices 112A-C. As a result, administration of client 102 is simplified and the impact of simplification may be significant when the network includes hundreds or thousands of clients. Another benefit of this approach is that client 102 does not need to determine which printer meets the requirements of a particular print job and the client can permit the print server 104 to determine an appropriate printing device 112A-C.

Network printing for clients that do not have printer drivers is described in U.S. patent application Ser. No. 11/345,503 entitled "Network Printing With Driverless Clients", filed Jan. 31, 2006, the entire contents of which is herby incorporated by reference for all purposes as if fully disclosed herein.

From the print drivers, SDP handler 110 may obtain capabilities of printing devices 112A-C. For example, SDP handler 110 can send various request messages to the print drivers and receive responsive information about the number and type of paper trays of the associated printer, the status of the printer, color capability, special paper handling capability, security capability, etc. SDP handler 110 may also request the capabilities of printing devices 112A-C directly from printing devices 112A-C. In an embodiment, SDP handler 110 and the printing devices 112A-C implement Web Services and include an HTTP server and Web Services logic; the SDP handler sends one or more Web Services requests about capabilities to the printing devices, and the printing devices respond with Web Services responses that include capability information.

Web services protocols are defined by the World Wide Web Consortium ("W3C"). W3C is an international consortium where member organizations, a full-time staff, and the public work together to develop standards for the World Wide Web and the Internet. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described by Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks. The specifications that define web services are intentionally modular, and, as a result, there is no one document that defines all web services. Instead, there are a few core specifications that are supplemented by other specifications as the circumstances and choice of technology dictate. The most common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example. WSDL is an XML format that allows web service interfaces to be described along with the details of those interfaces' bindings to specific protocols. WSDL is typically used to generate server and client code, and for configuration. WS-Security defines how to use XML encryption and XML signature in SOAP to secure message exchanges. WS-ReliableExchange is a protocol for reliable messaging between two web services.

Optionally, each of the printing devices 112A-C comprises a radio frequency identification (RFID) tag, and print server 104 includes an RFID tag reader. In this embodiment, print server can determine the physical location of a printing device 112A-C by reading the tag on the printing device. The location information can be reported to client 102 in response to a client request or as part of confirming that a printing job completed successfully.

Capabilities of a Printing Device

Capabilities of a printing device may include any features that are supported by that printing device. Such features may include but are not limited to: color printing; photo printing; duplex printing; lock printing; security features such as delivery to a secured output tray; number of paper trays, size of paper trays, special paper handling capabilities, scanning capability including resolution, contrast, and related settings; document style such as two-sided printing or one-sided printing; finishing features such as stapling, binding and punching; image orientation; source paper type; output tray location; graphics mode; margin shifting; tandem printing; toner save mode; capabilities for printing or not printing on tabs or overlays; transparency insertion; job handling features; watermark printing; and other features.

The capabilities of each printing device 112A-C may be stored in local storage of print server 104 or on a remote storage accessible by print server 104. When a user of client 102 desires to print, client 102 sends a capability request to print server 104, which request may be handled by client handler 106. The request is forwarded to core 108, which retrieves the latest capabilities from storage.

Core

Core 108 comprises the core logic of print server 104. For example, core 108 retrieves capabilities from any print drivers that are installed on print server 104. In an embodiment, when a new printing device is discovered and the device's print driver is installed, core 108 updates the list of capabilities. Core 108 may comprise one or more modules.

Core 108 also searches, based on the parameters designated in a client request, for the printing device whose capabilities best match the parameters. Determining the best match may be performed in multiple ways. In an embodiment, core 108 determines whether a particular printing device is available. There are numerous ways to determine whether a printing device is available. One way is for core 108 to send a ping packet to the printing device. A positive response indicates that the printing device is available. A negative response (or no response) indicates that the printing device is unavailable. If a printing device is not available, then a comparison between the client-designated parameters and the capabilities of the printing device are not necessary. Another way to determine whether a printing device is available is for the Printer Device Profile maintained in a Web Services module of the printing device to provide a printing device availability notification from the printing device to clients that subscribe to the notification.

In an embodiment, core 108 compares the client-designated parameters with an available printing device's capabilities. Client-designated parameters are the required capabilities that are specified in a printing request from a client. If the capabilities of an available printing device match the client-designated parameters, then the available printing device is a candidate to perform a print job. A client request may specify the level of importance for one or more certain parameters that take precedence over less important parameters.

In an embodiment, after all possible candidate printing devices are identified, core 108 selects one candidate printing device having capabilities that best match the user-designated parameters. Optionally, core 108 selects, or gives greater weight in selecting, a candidate printing device that is physically closest to the requester (e.g., client 102).

Parameters

Users may designate parameters in multiple ways, for example, according to degrees of importance or preference. For example, some parameters may be necessary, such as color printing. Other parameters may be highly desirable, but not necessary. Thus, parameters in a request of a client are not always required, essential or necessary to completing a print job. For example, each parameter may be associated with a preference or priority value in a 3-point scale in which "3" indicates necessary, "2" indicates highly desirable, and "1" indicates little importance. If two printing devices are identical except that the first printing device includes a capability with which a client associated a "1" and the second printing device does not include that capability, then the first printing device is selected as a better match than the second printing device.

Clients may designate parameters using different means. For example, a client may send a GET HTTP request to print server 104, which returns an HTML document to the client comprising a form in a Web-based graphical user interface (GUI). The GUI web form may comprise many fields and/or drop down menus that allow a user to designate various parameters. Upon selecting a "submit" button, the client sends the filled-out web form to print server 104. From the filled-out web form, print server 104 determines the parameters that the capabilities of an available printing device should satisfy.

Alternatively, print server 104 may associate a set of default parameters for one or more clients. For example, some clients may request having a print job processed by printing devices that have a specific set of capabilities without having to designate the same parameters repeatedly. Thus, a set of parameters may be saved for each user and/or client, and a client request can specify an index value or name for a saved set of parameters, which the print server retrieves and uses to process the print job.

If the capabilities of none of printing devices 112A-C satisfy all the parameters, then core 108 may inform client 102 that no printing device matches. Core 108 may indicate which parameters could be removed or changed to cause at least one of the available printing devices to satisfy the request. In various embodiments, core 108 may identify all the parameters, identify parameters that should be removed, or identify the closest matching printing device and capabilities that the printing device lacks. Other responsive actions may be performed.

In an embodiment, in determining a printing device that best matches a client request, core 108 may take into account the location of available printing devices relative to client 102. Global positioning system (GPS) or radio-frequency identification (RFID) may be used to provide location information for client 102 and for printing devices 112A-C. Location information for a machine may additionally indicate on which floor the machine is located.

Accordingly, in an embodiment the core 108 searches for a best fit of the printing devices to the client's requirements by taking into account any of the following parameters, which may be weighted according to user preferences that are specified in a client request:

1. The printing device is available.
2. The printing device's capability matches or is the closest match to the user's requirements.
3. The printing device is closest to the user.
4. The printing device satisfies the security requirements that the user specified.

Example Print Server Process

Figure 2:
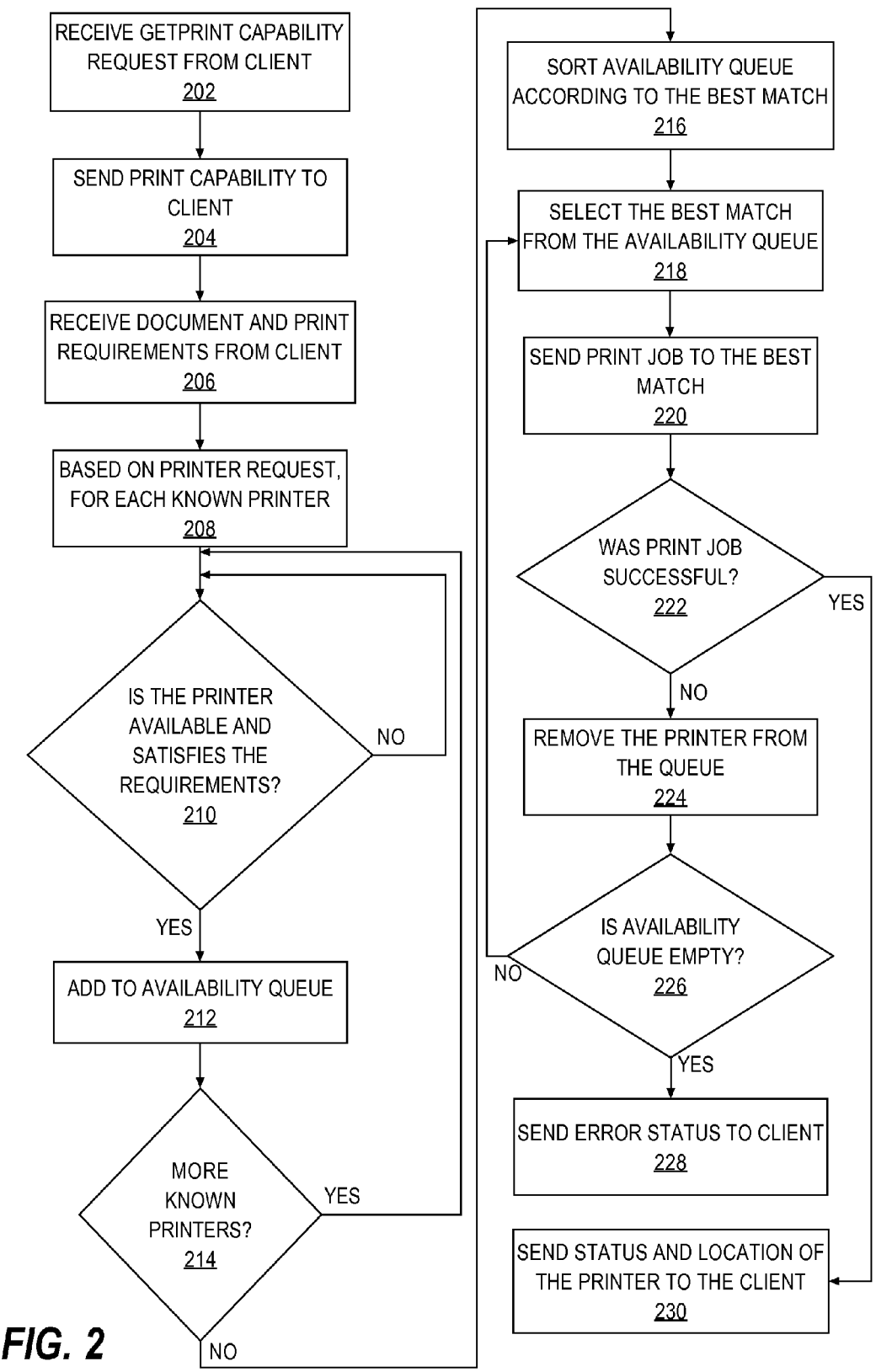
FIG. 2 is a flow chart of a print server servicing a client print request.

FIG. 2 is a flow chart that illustrates servicing a client print request. For purposes of illustrating a clear example, FIG. 2 is described herein with reference to the structure shown in FIG. 1. However, the broad approach represented in FIG. 2 is not limited to the context of FIG. 1 and the approach of FIG. 2 may be used with other network arrangements and with other physical or logical structure.

At step 202, client handler 106 receives a capability request from client 102. In response, the client handler determines what capabilities are associated with printing devices that are known to the client handler or registered with the client handler. The client handler forms a response to the capability request that describes the capabilities of the printing devices. At step 204, client handler 106 sends the response with the capabilities of one or more printing devices 112A-C to client 102.

At step 206, client handler 106 receives print data and parameters from client 102. The print data may be an attachment to a web form that indicates user-designated parameters. The print data and parameters may include one or more weight values that indicate an importance of the associated parameter or capability, so that the particular printing device that best satisfies the parameters can be determined when the parameters are weighted according to the weight values. The weight values also may be received in the capability request of step 202, and the request of step 202 and the document and print requirements of step 206 may be received at the same time and in the same request.

Client handler 106 passes the print data and parameters to core 108. Steps 208-214 are performed for each identified printing device.

At step 208, core 108 identifies a first printing device. At step 210, core 108 determines whether the first printing device is available (e.g., online) and satisfies the parameters. If the first printing device is unavailable, then the process proceeds to step 210 where core 108 analyzes the next identified printing device. If the first printing device is available and satisfies the parameters, then the process proceeds to step 212.

At step 212, core 108 adds a reference to the printing device identified in step 210 to an availability queue that identifies available printing devices whose capabilities (at least nearly) satisfy the parameters.

At step 214, core 108 determines whether there are any more printing devices to analyze. If there are more printing devices to analyze, then the process proceeds to step 210. If not, then the process proceeds to step 216.

At step 216, if there are multiple printing devices identified in the availability queue, then the core 108 arranges the availability queue based on best match. Arranging the availability queue may comprise a sort operation or other rearrangement based on parameter values, weight values received in the client request, or other factors.

At step 218, core 108 selects the printing device that best matches the client request. For example, if two printing devices 112A-C are identical in functionality but the first printing device is physically closer to the user than the second printing device, then the first printing device is selected as the best match.

In a related embodiment, as soon as core 108 identifies the first available printing device having capabilities that satisfy all the parameters, core 108 sends a print job to that printing device without building an availability queue. Thus, in this embodiment, the process may proceed from step 208 directly to step 220. At step 220, core 108 sends a print job to the best match printing device. The print job may comprise the print data that client 102 sent, except the print data is in a converted form that is recognizable by the selected printing device using a printer driver for the selected printing device.

At step 222, core 108 determines if the print job was successful. For example, an unsuccessful print job may have resulted from a paper jam, lack of paper, lack of ink or toner, or the selected printing device may have been offline before the print job could be completed.

Core 108 may determine that the print job was unsuccessful in numerous ways. For example, the best match printing device may notify print server 104 that the print job was not completed. As another example, core 108 determines that the print job was not completed based on a timeout, without receiving any communication from the selected printing device. Another way to determine whether a print job was successful is for the Printer Device Profile maintained in a Web Services module of the printing device to provide a job end status notification from the printing device to clients that subscribe to the notification.

If the print job was unsuccessful, then the process proceeds to step 224. At step 224, core 108 removes the selected printing device from the availability queue and the process proceeds to step 226. If the print job was successful, then the process proceeds to step 230.

At step 226, core 108 determines whether the availability queue is empty. If not, then the process proceeds to step 218. If the availability queue is empty, then the process proceeds to step 228.

At step 228, client handler 106 sends an error status message to client 102 that informs client 102 that the print job was unsuccessful. Optionally, client handler 106 may send data that indicates which printing devices were excluded from consideration based on the parameters and/or which parameters should be "relaxed" or removed in order for those printing devices to be considered. In this way, the user of client 102 may decide to submit the print job to a different printing device that does not fully satisfy the client's original preferences. Examples of a less satisfactory printing device include but are not limited to a less secure printing device or a printing device that is located on a different floor, depending on the client request.

At step 230, client handler 106 sends a message to client 102 providing the status of the print job and location of the printing device that completed the print job. As a result, a user associated with the client can determine where to obtain one or more printed documents.

Figure 3:
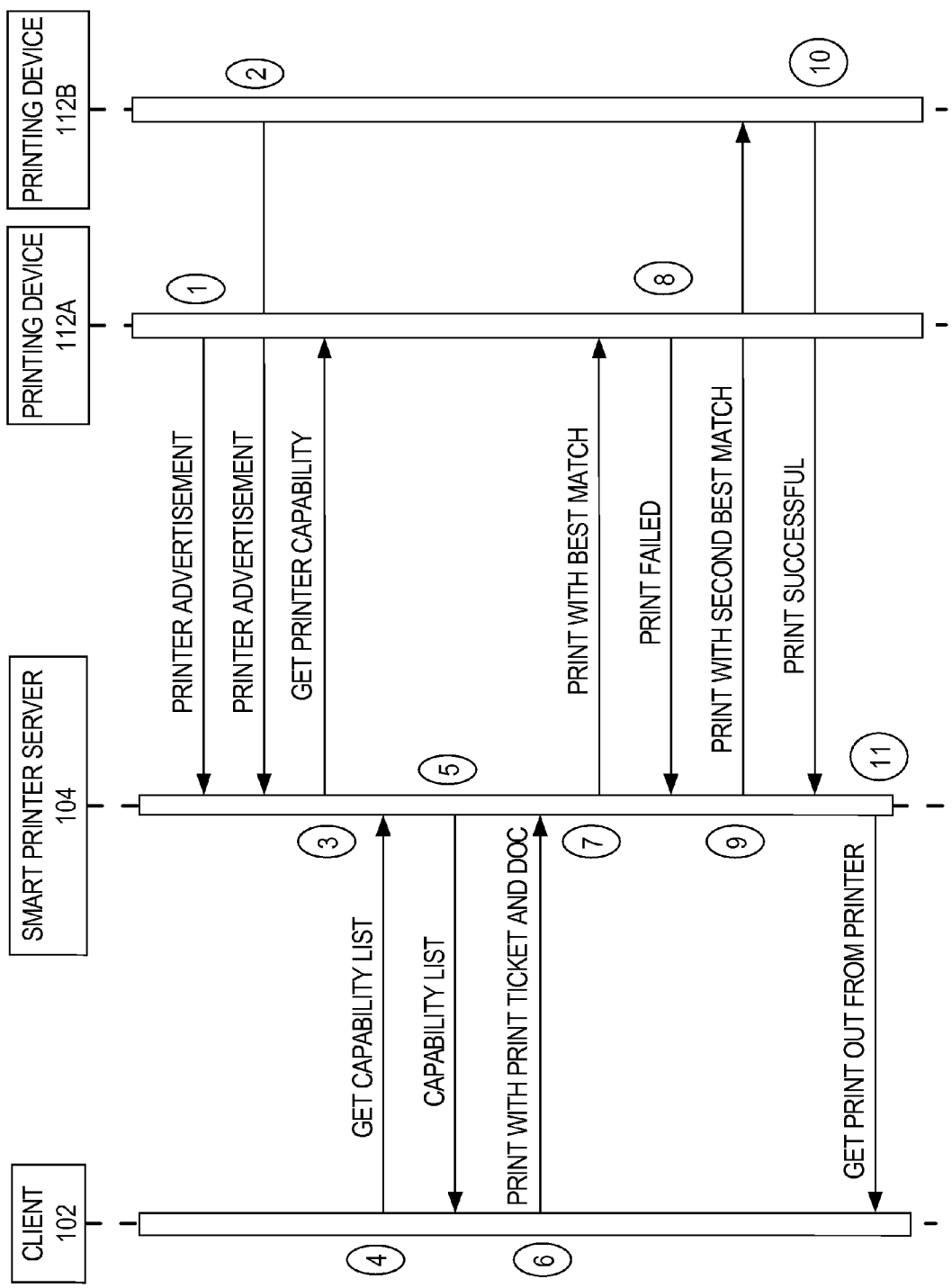
FIG. 3 is a sequence diagram of a print server servicing a client print request.

FIG. 3 is a sequence diagram illustrating a print server servicing a client print request. For purposes of illustrating a clear example, FIG. 3 is described herein with reference to the structure shown in FIG. 1. However, the broad approach represented in FIG. 3 is not limited to the context of FIG. 1 and the approach of FIG. 3 may be used with other network arrangements and with other physical or logical structure.

At steps 1 and 2, printing devices 112A-B, respectively, send an advertisement message to print server 104. The advertisement messages may comprise multicast or broadcast messages that are sent to all devices on the same network. The advertisements may be "hello" messages that indicate that the sending devices are available to process requests for the devices' respective services. For example, printing device 112A may be a new device that is connected to the network for the first time. As another example, printing device 112B may be a device that was previously connected to the network, but which was taken offline for repairs or maintenance. The "hello" message may be based on the messages that are defined in the specifications for Web Services for Devices.

The advertisements may conform to a discovery protocol such as Service Discovery Protocol. As an alternative to steps 1 and 2, the print server 104 issues one or more messages under a discovery protocol and waits for responses from printing devices that identify the printing devices and provide the capabilities of the printing devices.

In still another alternative, the service discovery protocol handler 110 of print server 104 installs printer drivers 114A-114C for printing devices 112A-112C or prompts a system administrator to install the drivers. The service discovery protocol handler 110 then obtains printer capability information directly from the printer drivers or directly from the printing devices 112A-112C.

At step 3, print server 104 sends a "get printer capability" message to printing device 112A. Because such a message was not sent to printing device 112B, print server 104 may have already installed a printer driver for printing device 112B. From the installed driver, print server 104 "knows" the capabilities of printing device 112B. Printing device 112A responds to the "get printer capability" message by providing a responsive message that describes the capabilities of the printing device 112A. Web Services messages may be used or HTTP GET-POST sequences may be used.

As a result, through steps 1 to 3, the print server 104 builds a list of capabilities for all printers that are discovered in the network or located through advertisement messages. When a new printer is found and its driver is installed, the new printer's capabilities are updated to the list. Thus, steps 1 to 3 may be performed at any time and may be performed asynchronously with respect to other steps of FIG. 3 and FIG. 2. However, there is no need to continuously update the client 102 with new printer drivers when new printers are added.

At step 4, client 102 sends print server 104 a "get capability list" message. Such a message requests the capabilities of each printing device with which print server 104 can communicate. At step 5, print server 104 sends the capabilities of printing devices 112A and 112B to client 102. At step 6, client 102 sends an electronic document to print server 104 along with a print ticket. In an embodiment that uses Web Services, the print ticket is an electronic document that describes characteristics of a particular print job; the print ticket may comprise an XML document that conforms to a schema defining print ticket elements.

At step 7, print server 104 determines that the capabilities of printing device 112A best match the parameters indicated in the print request. Therefore, the print server 104 prepares and sends a transformed version of the electronic document to printing device 112A. The transformed version of the electronic document is prepared using a printer driver installed in print server 104 for the printing device 112A. At step 8, if the printing job failed, then printing device 112A sends a print failed message to print server 104.

At step 9, print server 104 selects printing device 112B as the next best match to print the electronic document. Therefore, the print server 104 prepares and sends a transformed version of the electronic document to printing device 112B using a printer driver associated with printing device 112B. At step 10, printing device 112B notifies print server 104 that the electronic document was printed successfully. In response to this notification, at step 11, print server 104 notifies client 102 that printing device 112B successfully printed the electronic document. The notification of step 11 may include location information that indicates the name of printing device 112B and/or where printing device 112B is physically located.

Numerous benefits may be realized through some embodiments of the invention. For example, a user or client computer might not be required to keep track of newly added printing devices, know what capabilities each printing device has, and/or install any print drivers. A user or client only needs to know how to access a print server. Thereafter, the print server accomplishes most printing activities other than actual printing and informs the user or client of the result.

Implementation Mechanisms—Hardware Overview

Figure 4:
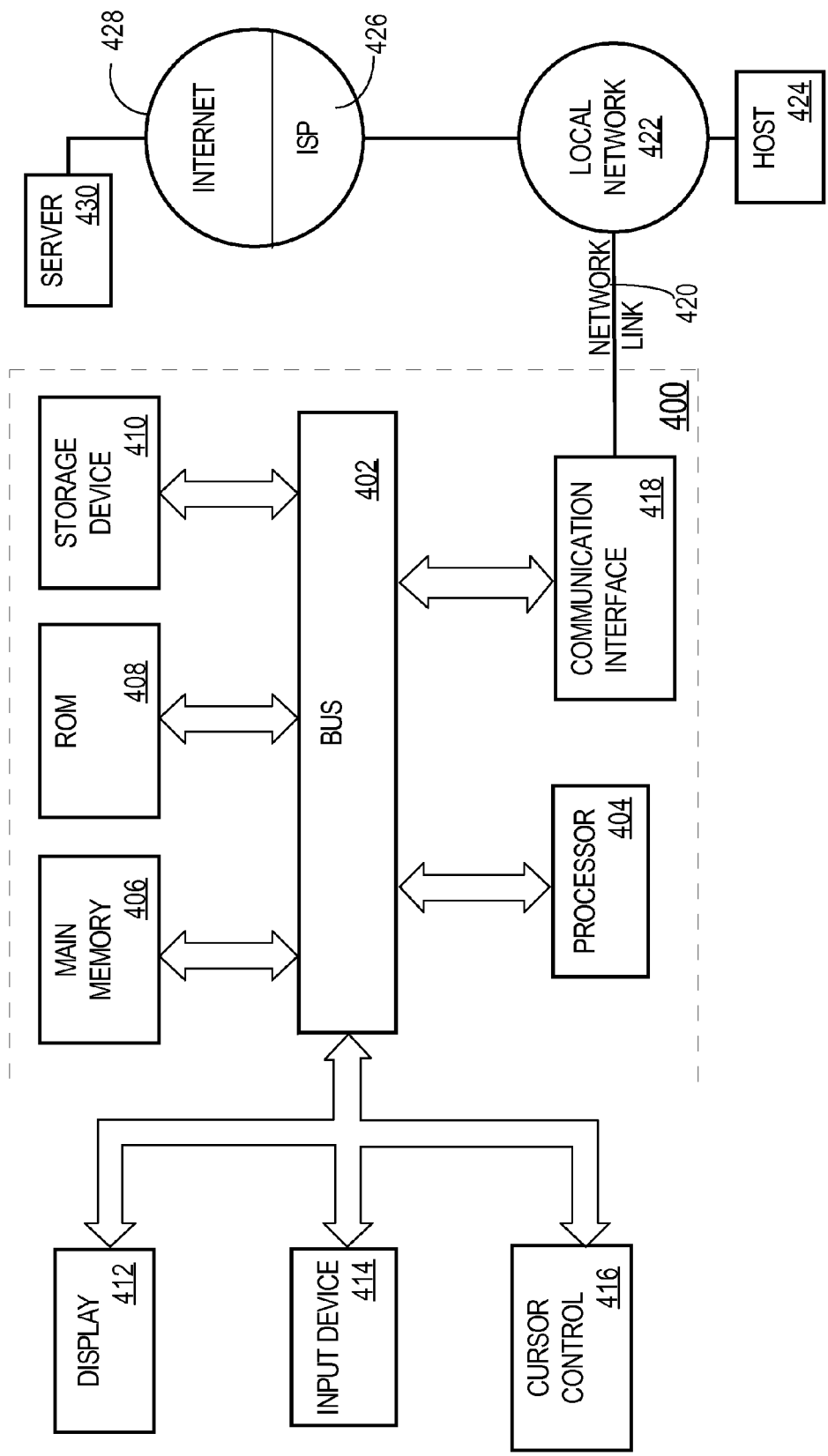
FIG. 4 illustrates an example print server computer system.

The approaches described herein may be implemented on any type of computing platform or architecture. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus comprising:
a network interface capable of coupling to a network;
a plurality of printer drivers, each configured to convert data to a form that is specific to one or more compatible printing devices of a plurality of printing devices that are separate from the data processing apparatus and that may be in the network;
print server logic which when executed by one or more processors is operable to perform the machine-implemented steps of:
receiving, from a client computer that is separate from the data processing apparatus and that lacks one or more of the plurality of printer drivers, a request to print one or more documents represented in print data in the request;

receiving, from the client computer, one or more parameters for printing the one or more documents;

determining, based on the one or more parameters, a particular printing device from among the plurality of printing devices; and based on the determination, converting the print data using one of the plurality of printer drivers that is compatible with the particular printing device and sending the converted print data to the particular printing device;

wherein the one or more parameters are a plurality of parameters, wherein the print server logic further comprises logic which when executed is operable to perform:

receiving, in the request from the client computer, a weight values associated with each of the plurality of parameters, wherein each of the weight values indicates an importance of the associated parameter; and determining the particular printing device that best satisfies the plurality of parameters when the plurality of parameters are weighted according to the weight values.

2. The data processing apparatus of claim 1, wherein:
the print server logic comprises a service discovery protocol handler; and
the service discovery protocol handler is operable when executed to perform discovering the one or more compatible printing devices in the network using requests in a service discovery protocol.

3. The data processing apparatus of claim 1, wherein:
the print server logic comprises a client handler;
the client handler is operable when executed to perform sending, to the client computer, confirmation data that informs the client computer that the print data was successfully printed at the particular printing device;
the confirmation data includes a name and location of the particular printing device.

4. The data processing apparatus of claim 1, wherein the print server logic further comprises logic which when executed is operable to determine the particular printing device that best satisfies the one or more parameters.

5. The data processing apparatus of claim 1, wherein the print server logic further comprises logic which when executed is operable to perform receiving an advertisement message, from a printing device of the plurality of printing devices, that indicates that the printing device is available to service requests.

6. The data processing apparatus of claim 1, wherein the print server logic further comprises logic which when executed is operable to perform installing one of the plurality of printer drivers for the particular printing device.

7. The data processing apparatus of claim 1, wherein the print server logic further comprises logic which when executed is operable to perform retrieving, from one of the plurality of printer drivers, print capability data identifying one or more capabilities of the particular printing device.

8. The data processing apparatus of claim 1, wherein the print server logic further comprises logic which when executed is operable to perform retrieving print capability data from the particular printing device indicating print capabilities of the particular printing device.

9. The data processing apparatus of claim 1, wherein the one or more parameters comprise at least one of a location of one of the plurality of printing devices relative to the client computer or one or more security features of one of the plurality of printing devices.

10. The data processing apparatus of claim 1, wherein the print server logic further comprises logic which when executed is operable to perform:

creating and storing an availability queue comprising information identifying printing devices that are available and that satisfy the one or more parameters; and removing information identifying the particular printing device in response to receiving, from the particular printing device, an error message that indicates that a print job failed to print at the particular printing device.

11. The data processing apparatus of claim 10, wherein the print server logic further comprises logic which when executed is operable to perform:

selecting a second printing device from the availability queue in response to receiving the error message;

converting the print data using one of the plurality of printer drivers that is compatible with the second printing device; and sending the converted print data to the second printing device.

12. One or more non-transitory machine-readable storage media storing instructions which, when executed by one or more processors, cause:

receiving, at a data processing apparatus, from a client computer that is separate from the data processing apparatus and that lacks one or more printer drivers each configured to convert data to a form that is specific to one or more compatible printing devices, of a plurality of printing devices, that are separate from the data processing apparatus and that may be in a network, a request to print one or more documents represented in print data in the request;

receiving, from the client computer, one or more parameters for printing the one or more documents;

determining, based on the one or more parameters, a particular printing device from among the plurality of printing devices; and based on the determination, converting the print data using one of a plurality of printer drivers that is compatible with the particular printing device and sending the converted print data to the particular printing device;

wherein the one or more parameters are a plurality of parameters, wherein the instructions, when executed by the one or more processors, further cause:

receiving, in the request from the client computer, a weight value associated with each of the plurality of parameters, wherein each of the weight values indicates an importance of the associated parameter; and determining the particular printing device that best satisfies the plurality of parameters when the plurality of parameters are weighted according to the weight values.

13. The one or more machine-readable media of claim 12, wherein the instructions, when executed by the one or more processors, further cause discovering one or more printing devices in the network using requests in a service discovery protocol.

14. The one or more machine-readable media of claim 12, wherein the instructions, when executed by the one or more processors, further cause sending, to the client computer, confirmation data that informs the client computer that the print data was successfully printed at the particular printing device, wherein the confirmation data includes a name and location of the particular printing device.

15. The one or more machine-readable media of claim 12, wherein the instructions, when executed by the one or more processors, further cause determining the particular printing device that best satisfies the one or more parameters.

16. The one or more machine-readable media of claim 12, wherein the one or more parameters comprise at least one of a location of one of the plurality of printing devices relative to the client computer or one or more security features of one of the plurality of printing devices.

17. The one or more machine-readable media of claim 12, wherein the instructions, when executed by the one or more processors, further cause:
  creating and storing an availability queue comprising information identifying printing devices that are available and that satisfy the one or more parameters; and
  in response to receiving, from the particular printing device, an error message that indicates that a print job failed to print at the particular printing device, removing information identifying the particular printing device.

18. The one or more machine-readable media of claim 17, wherein the instructions, when executed by the one or more processors, further cause:
  in response to receiving the error message, selecting a second printing device from the availability queue;
  converting the print data using one of the plurality of printer drivers that is compatible with the second printing device; and
  sending the converted print data to the second printing device.

* * * * *